United States Patent [19]

Brück et al.

[11] Patent Number: 4,469,830
[45] Date of Patent: Sep. 4, 1984

[54] PROCESS FOR INCREASING THE OZONE-RESISTANCE OF A RUBBER

[75] Inventors: Dieter W. Brück, Cologne; Werner Jeblick, Leverkusen; Lothar Ruetz, Dormagen, all of Fed. Rep. of Germany

[73] Assignee: Bayer Aktiengesellschaft, Leverkusen, Fed. Rep. of Germany

[21] Appl. No.: 515,878

[22] Filed: Jul. 22, 1983

[30] Foreign Application Priority Data

Aug. 3, 1982 [DE] Fed. Rep. of Germany ....... 3228861

[51] Int. Cl.$^3$ ............................. C08K 5/06; C08K 5/15
[52] U.S. Cl. ..................................... 524/109; 524/110; 524/111
[58] Field of Search ............... 260/800; 524/109, 110, 524/111

[56] References Cited

U.S. PATENT DOCUMENTS 2,197,421  4/1940  Smith et al. ........................ 524/109
3,116,301 12/1963  Williams et al. .................... 524/109
4,054,551 10/1977  Layer ................................. 524/111
4,088,630  5/1978  Roos et al. ........................ 260/800

Primary Examiner—Morton Foelak
Assistant Examiner—Kriellion Morgan
Attorney, Agent, or Firm—Connolly and Hutz

[57] ABSTRACT

The ozone-resistance of natural and synthetic rubber is increased when an enol ether of the formula

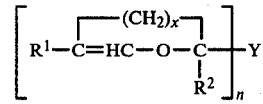

is incorporated.

3 Claims, No Drawings

PROCESS FOR INCREASING THE OZONE-RESISTANCE OF A RUBBER

This invention relates to a process for increasing the ozone-resistance of natural and/or synthetic rubber by means of enol ethers corresponding to the following general formula (I):

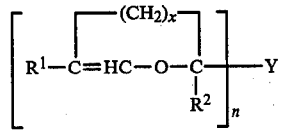

in which
- $R^1$ and $R^2$ may be the same or different and each represents hydrogen, or a straight-chain or branched chaim $C_1$–$C_{10}$-alkyl group, preferably $C_1$–$C_6$-alkyl group, in addition to which
- $R^2$ may represent an aldehyde group or a valance to Y,
- $X = 1$ or 2, preferably 2,
- $n = 1$–4, preferably 1–3 and
- Y represents an n-functional organic radical containing at least one carbon atom or oxygen.

Y preferably represents the following radicals:

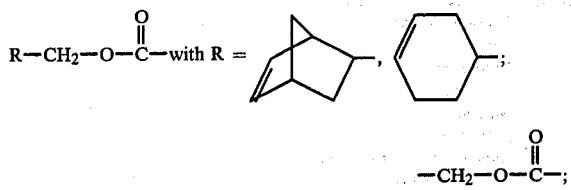

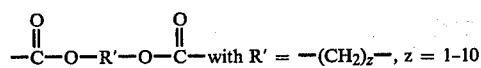

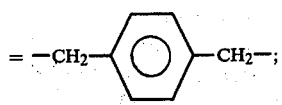

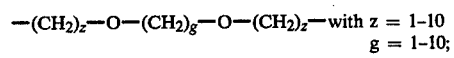

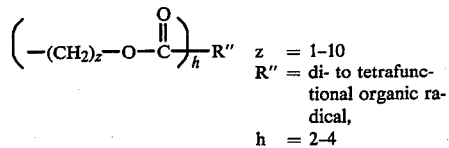

$R''$ preferably is $C_1$–$C_{10}$-alkylene, $C_2$–$C_{10}$-alkenylene, phenylene or cyclohexylene.

Preferred compounds correspond to the formula

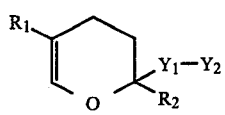

wherein $R_1$ and $R_2$ denote hydrogen or methyl, $Y_1$ denotes —$CH_2$—O—CO—, —COO—$CH_2$— or —O—$(CH_2)_m$—O— $Y_2$ denotes a radical of the formulas

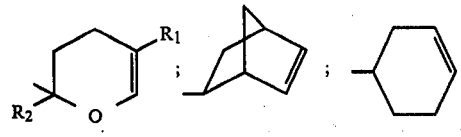

and m denotes 4 to 8.

The enol ethers are known or can be prepared by known methods (U.S. Pat. Nos. 2,537,921; 2,514,172; GB-PS 1,108,017; J.Am.Chem.Soc., 73, (1951) 5267).

The enol ethers are solid or liquid substances which may be homogenously incorporated and distributed without difficulty in the crude rubber. They are more effective than known anti-ozonants (DE-AS No. 19 17 600, DE-AS No. 25 49 911, DE-AS No. 16 93 163), particularly in natural rubber and are not dis-colouring.

Suitable rubbers are natural or synthetic rubber obtained, for example, from butadiene, dimethyl butadiene, chloroprene, isoprene and its homologs, or copolymers of these conjugated diolefins with vinyl compounds, such as styrene, α-methyl styrene, acrylonitrile, methacrylonitrile, acrylates, methacrylates, and also terpolymers of ethylene, propylene with at least one unconjugated diene, for example dicyclopentadiene, 5-ethylidene-2-norbornene, or 1,4-hexadiene.

The anti-ozonants may be mixed into the rubbers in the usual way, for example on mixing rolls or in an internal mixer. They are added before or at the same time as the other constituents, although they may also be added as the last constituent of the mixture.

Other standard constituents are, for example, vulcanising agents, such as sulfur, vulcanisation accelerators, for example thiazoles such as 2-mercaptobenzthiazole, dibenzothiazyl sulfide, sulfenamides, such as benzothiazyl-2-cyclohexyl sulfenamide, benzothiazyl-2-t-butyl sulfenamide or benzthiazyl sulfenic acid morpholide, guanidines, such as diphenyl guanidine or di-o-tolyl guanidine, dithiocarbamates, such as zinc diethyl dithiocarbamate, thiurams, such as tetramethyl thiuram disulfide and ethylene thiourea. In addition, mixtures of accelerators may be used. Other auxiliaries, for example fillers, such as carbon black or chalk, oxidation inhibitors, waxes, pigments, zinc oxide, stearic acid and processing oils, may also be present.

The enol ethers may be added to the rubber in the conventional quantities, preferably in quantities of from 0.05 to 10% by weight and, more particularly, in quantities of from 0.5 to 5% by weight, based on the rubber.

Vulcanisation of the rubber is obtained by heating to the usual temperatures, preferably in the range from 120° to 170° C.

EXAMPLE 1

3,4-dihydro-2H-pyran-2-methyl-(3,4-dihydro-2H-pyran-2-carboxylate)

In a water-cooled reactor, 0.7 g of aluminium isopropylate in the form of a $CCl_4$-solution of 0.5 g of aluminium isopropylate per cc of solution were slowly added dropwise to 3,4-dihydro-2H-pyran-2-carboxaldehyde (2.5 moles). The mixture was stirred to distribute the aluminium isopropylate and, after the onset of the exothermic reaction, was maintained by cooling at 35° to 40° C. After a total reaction time of 4 hours, the solution was subjected to fractional distillation, 3,4-dihydro-2H-pyran-2-methyl-(3,4-dihydro-2H-pyran-2-carboxylate)

distilling over at a temperature of 115°–119° C./6 Pa (yield 74% of the theoretical).

EXAMPLE 2

Aldol condensation products of 3,4-dihydro-2H-pyran-2-carboxaldehyde corresponding to Examples 8 to 10 of British Pat. No. 1,108,017, for example:

100 g of 3,4-dihydro-2H-pyran-2-carboxaldehyde were introduced into a flask equipped with a stirrer and thermometer. 0.5 ml of concentrated sodium hydroxide is added dropwise with stirring, the temperature of the reaction solution rising to 115° C. The reaction mixture was then stirred for about another 30 minutes and contained a mixture of 30 to 40% of 2-(3,4-dihydro-2H-pyran-2-carboxaldehyde)-2-(3,4-dihydro-2H-pyran)-methanol and 50 to 60% of 5,8,10-trioxa-7-hydroxy-9,11-bis-2-(3,4-dihydro-2H-pyran)-spiro-(5,5)-undec-3-ene or its tautomeric form, 1-hydroxy-1-(2-(3,4-dihydro-2H-pyran) (-1'-(2'-(3',4'-dihydro-2H-pyran))-1'-(3'',4''-dihydro-2H-pyran-2''-carboxaldehyde))-dimethyl ether, as shown in Example 17 of British Pat. No. 1,108,017.

EXAMPLE 3

1,4-bis-(3'4'-dihydro-2H-pyran-2-oxy)-butane 2 moles of acrolein per mole of 1,4-butane diol divinyl ether, 5 g of hydroquinone and 300 ml of toluene was introduced into an autoclave. The reaction mixture was then heated for 9 hours to 110° C. under a pressure of about 2 bar. The mixture was then distilled. According to IR- and NMR-analysis, the distillate obtained at 105°–112° C./0.4 Torr had the required structure.

EXAMPLE 4

3,4-dihydro-2,5-dimethyl-2H-pyran-2-methyl-(3,4-dihydro-2,5-dimethyl-2-H-pyran-2-carboxylate)

2.5 moles of 3,4-dihydro-2,5-dimethyl-2H-pyran-2-carboxaldehyde were reacted as in Example 1. The reaction mixture was, differing from Example 1, first heated to 100° C., kept for 30 minutes at this temperature and then stirred for further 30 minutes at 150° C. The mixture was then distilled. The desired compound distilled at 106° to 109° C./0.15 Torr.

EXAMPLE 5

1 mol of 3,4-dihydro-2H-pyran-2-carboxaldehyde and 1 mol of norborn-3-en-1 carboxaldehyde were introduced into a water-cooled reactor and reacted as in Example 1. The reaction mixture was subjected to fractioned distillation and the fraction distilling at 130° C./0.8 Torr was isolated. According to GC-analysis the fraction consisted of 26% by weight of the compound of Example 1, 36% by weight of (norborn-3-en-1-methyl)-(3,4-dihydro-2H-pyran-2-carboxylate), 7% by weight of 3,4-dihydro-2H-pyran-2-methyl-(norborn-3-en-1carboxylate) and 31% by weight of norborn-3-en-1-methyl-(norborn-3-en-1-carboxylate).

EXAMPLE 6

The following rubber mixture was prepared on mixing rolls:

| | |
|---|---|
| Polychloroprene | 100.0 parts by weight |
| Magnesium oxide | 4.0 parts by weight |
| Stearic Acid | 0.5 part by weight |
| Precipitated silica (BET-value: 180 m³/g) | 20.0 parts by weight |
| Soft kaolin | 170.0 parts by weight |
| Titanium dioxide | 5.0 parts by weight |
| Antimony oxide | 5.0 parts by weight |
| Naphthenic mineral oil plasticiser | 20.0 parts by weight |
| Chloroparaffin | 10.0 parts by weight |
| Ethylene thiourea | 1.2 parts by weight |
| Zinc oxide | 5.0 parts by weight |
| Anti-ozonant, cf, Tables | |

$0.4 \times 4.5 \times 4.5$ cm test specimens of these mixtures were vulcanised in a press for 30 minutes at 150° C. 4 test specimens were then clamped into a plastics frame in such a way that surface elongations of 10, 20, 30 and 60% were obtained.

The stretched test specimens were then treated at room temperature with an air stream containing 1000 parts of ozone to 100 million parts of air. After intervals of 2, 4, 6, 8, 24, 48, 96 and 168 hours, the test specimens were visually examined for any cracks. The periods of time elapsing (in hours) before the first cracks were noticed are shown in the following Table. The tests were terminated after 168 hours (Table 3).

EXAMPLE 7

The following rubber mixture was prepared on mixing rolls:

| | |
|---|---|
| Natural rubber | 100.0 parts by weight |
| Zinc oxide | 10.0 parts by weight |
| Precipitated silica | 160.0 parts by weight |
| Titanium dioxide | 10.0 parts by weight |
| Stearic acid | 0.7 parts by weight |
| Anti-ozonant wax | 2.0 parts by weight |
| Dibenzothiazyl disulfide | 1.0 part by weight |
| Hexamethylene tetramine | 0.25 part by weight |
| Sulfur | 2.2 parts by weight |
| Anti-ozonant | 4.0 parts by weight |

The test specimens were press-vulcanised for 30 minutes at 140° C. Testing was carried out in the same way as described in Example 6 except that the ozone concentration was 100 rather than 1000 parts per 100 million parts of air (Table 1).

EXAMPLE 8

The following rubber mixture was prepared on mixing rolls:

| | |
|---|---|
| Styrene-butadiene copolymer | 100.0 parts by weight |
| Zinc oxide | 5.0 parts by weight |
| Carbon black (N 220) | 55.0 parts by weight |
| Naphthenic mineral oil plasticiser | 2.0 parts by weight |
| Highly aromatic mineral oil plasticiser | 2.0 parts by weight |
| Stearic acid | 2.0 parts by weight |
| Anti-ozonant wax | 2.0 parts by weight |
| Benzothiazyl-2-cyclohexyl sulfenamide | 1.3 parts by weight |
| Sulfur | 1.6 parts by weight |
| Anti-ozonant | 4.0 parts by weight |

The test specimens were press-vulcanised for 30 minutes at 150° C. Testing was carried out in the same way as described in Example 6, except that the ozone concentration amounted to 200 parts rather than 1000 parts per 100 million parts of air (Table 2a) and 400 parts per 100 million parts of air respectively (Table 2b).

TABLE 1

| | In natural rubber (NR) | | | |
|---|---|---|---|---|
| Elongation (%) | 10 | 20 | 30 | 60 |
| Product of Example 1 | >168 | >168 | 72 | 8 |
| Product of Example 2 | >168 | >168 | 24 | 8 |
| Product of Example 3 | >168 | >168 | >168 | 24 |
| Product of Example 4 | >168 | >168 | >168 | 96 |
| Product of Example 5 | >168 | >168 | >168 | >168 |

TABLE 2 a

| | In styrene-butadiene rubber (SBR) | | | |
|---|---|---|---|---|
| Elongation in % | 10 | 20 | 30 | 60 |
| Product of Example 1 | >168 | >168 | >168 | >168 |
| Product of Example 2 | >168 | >168 | >168 | >168 |
| Product of Example 3 | >168 | >168 | >168 | >168 |
| Product of Example 4 | >168 | >168 | >168 | >168 |

TABLE 2b

| | In styrene-butadiene rubber (SBR) | | | |
|---|---|---|---|---|
| Elongation in % | 10 | 20 | 30 | 60 |
| Product of Example 1 | >168 | >168 | 24 | 2 |
| Product of Example 3 | >168 | >168 | >168 | 2 |
| Product of Example 4 | >168 | >168 | >168 | 2 |
| Product of Example 5 | >168 | >168 | 4 | 2 |

TABLE 3

| | In polychloroprene (CR) | | | | |
|---|---|---|---|---|---|
| | Quantity of enol ether (% by weight based on | | | | |
| Elongation in % | CR) | 10 | 20 | 30 | 60 |
| Product of Example 1 | 1,0 | >168 | >168 | >168 | >168 |
| Product of Example 2 | 0,5 | 24 | 24 | 8 | 8 |
| Product of Example 5 | 1,0 | >168 | >168 | >168 | >168 |

We claim:
1. Process for increasing the ozone-resistance of a natural and synthetic rubber which comprises incorporating therein an enol ether of the formula

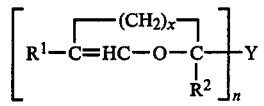

in which
  $R^1$ and $R^2$ may be the same or different and represent hydrogen, straight-chain or branched $C_1$–$C_{10}$-alkyl, in addition to which
  $R^2$ may also represent an aldehyde group or a valence to Y,
  X=1 or 2,
  n=1 to 4, and
  Y represents a group of the formula

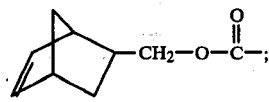

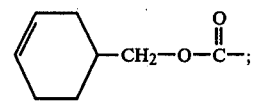

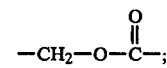

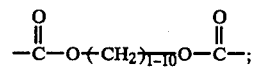

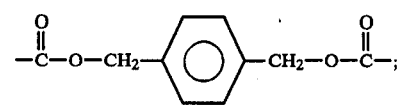

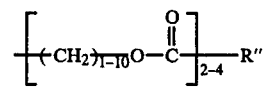

where R″ represents a $C_1$–$C_{10}$-alkylene, $C_2$–$C_{10}$-alkenylene, phenylene or cyclohexylene.

2. The process of claim 1 in which
  $R^1$ and $R^2$ represent $C_1$–$C_6$-alkyl,
  x=2 and
  n=1 to 3.

3. The process of claim 1 wherein the enol ether corresponds to the following formula

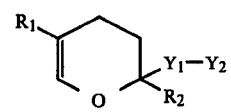

wherein
  $R^1$ and $R^2$ denote hydrogen or methyl
  $Y^1$ denotes —$CH_2$—OCO—, —COO—$CH_2$— or —O—$(CH_2)_m$—O—
  $Y^2$ denotes

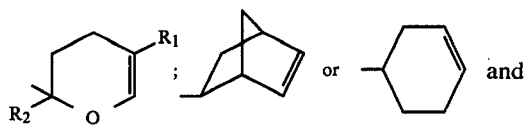

m denotes a number 4 to 8.

* * * * *